Sept. 30, 1930.  A. S. THOMPSON  1,777,185
TELESCOPE BENCH LIGHT
Filed Feb. 13, 1929
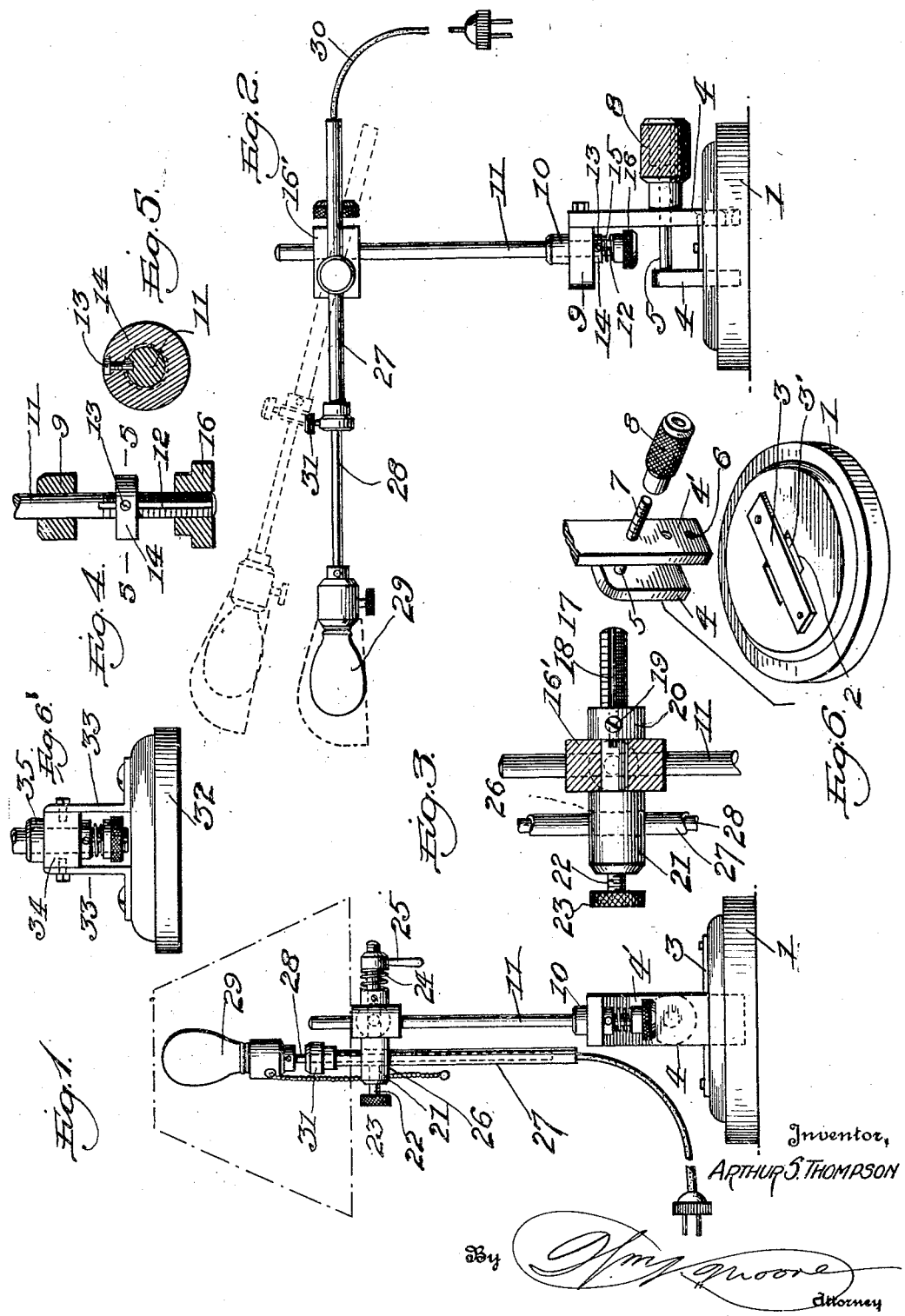
Inventor,
ARTHUR S. THOMPSON Patented Sept. 30, 1930

1,777,185

UNITED STATES PATENT OFFICE

ARTHUR S. THOMPSON, OF ONTARIO, CALIFORNIA

TELESCOPE BENCH LIGHT

Application filed February 13, 1929. Serial No. 339,581.

My invention relates to improvements in telescope bench lights, capable of use by watchmakers and others requiring a light or lamp which can be adjusted to direct the light in proper relation to the work.

One object of my invention is the provision of a light or lamp of the character and for the purpose stated which can be instantly adjusted to the desired position and which will be small in size to occupy a limited space.

Another object of the invention is the provision of a light which will comprise few parts to insure simplicity, durability and cheapness of construction to bring the light within the price range of any person requiring such a light.

Another object of my invention is the provision of a telescope light which may be used as a bench or desk light, or as a floor light, and which will be of ornamental appearance and which will be practical and efficient in every particular.

With these objects in view my invention consists of a telescope light embodying novel features of construction and combination of parts, substantially as described and claimed and as shown in the accompanying drawing, in which:

Figure 1 represents a front view of a telescope light constructed according to my invention.

Figure 2 represents a side view taken at a right angle to Figure 1.

Figure 3 represents a detail view of the clamp for securing the telescoping light carrying member to the supporting member.

Figure 4 represents a detail view of the supporting member, showing its connection with the base or pedestal.

Figure 5 represents a sectional view on line 5—5 of Figure 4.

Figure 6 represents a detail perspective view of the base, and bracket mounted therein, and Figure 6' is a side view of a modified form of base.

Referring by numeral to the drawings in which the same numbers of reference denote like parts in all the views:

The numeral 1 designates the supporting base, which in Figure 6 is provided with an opening 2, spanned by a strip 3, forming a pair of recesses 3', in which are received the lower ends of short plate 4 and the longer parallel plate 4', a pin 5, being carried by the plate 4, and passing through one of the openings 6, in the plate 4', and being threaded at its end 7, to receive the clamping sleeve 8, which acts to clamp the plates in adjusted position in the base.

To the upper end of the plate 4', is secured the ear 9, which forms the mount for the sleeve 10, in which fits the supporting member 11, which at its lower end is formed with a slot 12, to receive the adjusting screw 13, carried by the ring 14, and around the member adjacent said ring is the spring 15, and the screw cap 16 for holding the spring in place.

From this construction it will be noted that the base supports the bracket member and that the light supporting member is mounted in said bracket, and upon said supporting member is fitted the adjustable block or head 16', through which passes the threaded stem 17, having a slot 18, to receive the screw 19, in the ring 20, which acts to hold the block in proper vertical adjustment on the supporting member and also to secure the head 21, on said stem in proper position, said head having mounted therein a screw 22, formed with a milled head 23 forming a handle to operate the screw. As shown in Figure 1 the threaded stem 17, also has upon it the coiled spring 24, and the threaded handled nut 25.

The head 21, is provided with a vertical opening 26, in which fits the outer sleeve 27, movable in said head and retained by the said screw 22, and in this outer sleeve or tube fits closely and movably the smaller tube 28, which carries the light or lamp 29, and to which through said small tube leads the service supply cord 30, and the small tube is secured in adjusted relation in the larger tube by the clamp 31.

From the drawing and description the manner of operating and using my light is obvious and in Figure 6', a slightly modified form of base is used, comprising the base 32, the similar ears 33, and the supporting block 34 in which is mounted the supporting member 35, the operation being similar to the other form.

It will be noted that my light is portable and can be readily moved to any place desired and that the novel construction of the base and the adjustable connection between the vertical supporting member and the light carrying member allows of any desired adjustment of the light to place it in the most useful position and that the adjustments of the light can be made with ease and facility.

I claim:

1. A telescoping light of the character described, consisting of a supporting base, a supporting bracket mounted in said base, a supporting member mounted in said bracket, and a telescoping lamp supporting member adjustably carried by said supporting member said base having a central opening therein, a plate secured above said opening to form a pair of similar recesses, and said bracket being composed of a short and long parallel plate fitting in said pair of openings or recesses.

2. A telescoping light of the character described, consisting of a base, a bracket mounted in said base, a clamp for securing said bracket adjustably in said base, a supporting member adjustably mounted in said bracket, and a telescoping lamp supporting member adjustably carried by said supporting member said base having a central opening therein, a plate secured above said opening to form a pair of similar recesses, and said bracket being composed of a short and long parallel plate fitting in said pair of openings or recesses.

3. A telescoping light of the character described, consisting of a base, a bracket clamped in said base, a vertical supporting member mounted in said bracket, a clamp adjustable on said member, and a telescoping lamp supporting member adjustable vertically and in the arc of a circle in said clamp said base having a central opening therein, a plate secured above said opening to form a pair of similar recesses, and said bracket being composed of a short and long parallel plate fitting in said pair of openings or recesses.

In testimony whereof I affix my signature.

ARTHUR S. THOMPSON.